United States Patent [19]
Herrscher et al.

[11] Patent Number: 6,126,526
[45] Date of Patent: Oct. 3, 2000

[54] UNIVERSAL GRINDING MACHINE

[75] Inventors: Albert Herrscher, Berg. Gladbach; Victor Kopp, Erftstadt, both of Germany

[73] Assignee: Alfred H. Schutte GmbH & Co., KG, Cologne, Germany

[21] Appl. No.: 09/406,270

[22] Filed: Sep. 24, 1999

[30] Foreign Application Priority Data

Sep. 26, 1998 [DE] Germany .......................... 198 44 242

[51] Int. Cl.$^7$ .................................................. B24B 7/00
[52] U.S. Cl. ........................ 451/259; 451/65; 451/449; 451/450; 451/488; 451/362
[58] Field of Search ............................ 451/65, 259, 449, 451/450, 488, 362

[56] References Cited

U.S. PATENT DOCUMENTS

| | | | |
|---|---|---|---|
| 4,654,953 | 4/1987 | Hobbs | 29/568 |
| 5,045,564 | 9/1991 | Nakagawa et al. | 219/69.2 |
| 5,181,898 | 1/1993 | Piotrowski | 483/3 |
| 5,376,062 | 12/1994 | Zeichner | 483/55 |
| 5,439,431 | 8/1995 | Hessbruggen et al. | 483/14 |

FOREIGN PATENT DOCUMENTS

| | | |
|---|---|---|
| 44 32 612 | 3/1996 | Germany . |
| 196 07 176 | 8/1997 | Germany . |

OTHER PUBLICATIONS

German Search Report dated May 21, 1999.

*Primary Examiner*—Stephen F. Gerrity
*Assistant Examiner*—Shantese McDonald
*Attorney, Agent, or Firm*—Vickers, Daniels & Young

[57] ABSTRACT

A universal grinding machine, particularly for the grinding of tools, having a tool magazine in which a plurality of grinding tools, together with coolant supply devices which are matched thereto, are disposed in holders and can be supplied according to choice to the grinding spindle, where the grinding tool and its coolant supply device are introduced into their receivers; simultaneously by an axial movement of the grinding spindle and of the grinding spindle slide and are withdrawn by a movement of the grinding spindle and of its grinding spindle slide perpendicular to the grinding spindle axis so that the grinding tool and the coolant supply device are always in a position in relation to each other which is correct for machining.

7 Claims, 7 Drawing Sheets

UNIVERSAL GRINDING MACHINE

FILED OF INVENTION

This invention relates to a universal grinding machine, particularly for the machining of tools, having a grinding station in which a grinding spindle is disposed which is provided with a tool receiver and which can be advanced at least axially, and having a tool magazine which contains a plurality of different grinding tools which all fit into the tool receiver of the grinding spindle.

BACKGROUND OF INVENTION

Universal grinding machines, which are used for different grinding processes, require tools of different shapes in order to perform the desired grinding operations. All these grinding machines have a expanding mandrel of similar construction which fits into the chuck of the grinding spindle, and the tools are disposed in a tool magazine from which they can be withdrawn in order to change a tool and in which they can be inserted again.

Changing the tool, which is usually carried out manually, is laborious and time-consuming. There is also the problem of supplying coolant to the tool at the correct location for cooling the tool during grinding, since the point of action between the tool and the workpiece and the point of highest stress on the tool are different for grinding tools of different shapes. After changing a tool, the coolant supply therefore has to be re-aligned each time also, and if necessary the coolant nozzle also has to be changed, in order to effect the optimum cooling of the tool. This consumes a considerable amount of time, during which the machine cannot operate.

SUMMARY OF INVENTION

The object of the present invention is to construct a universal grinding machine of the type described above so that tool replacement can be effected in a rapid and simple manner, and so that the coolant supply device assumes its correct position in relation to the tool even after changing the tool.

This object is achieved according to the invention in that the tool magazine can move transversely to and fro in front of the grinding spindle and comprises tool holders, each of which holds both a grinding tool and the coolant supply device which is associated therewith in a position in which the grinding tool can be introduced axially into the tool receiver, and in which the coolant supply device can supply coolant to the grinding tool at the correct location during operation.

This design has the advantage that a separate coolant supply device is assigned to each tool, which coolant supply device is specially adapted to the tool concerned and is already provided in the tool magazine in its correct position in relation to the tool. By moving the tool magazine to and fro, the tool which is desired in each case can be brought directly in front of the tool receiver of the grinding spindle, which moves over to the expanding mandrel of the tool by a simple advance movement in an axial direction and clamps the tool in its chuck.

The tool magazine does not require a separate drive mechanism if it can be coupled to the workpiece holder and can be moved together with the latter in front of the grinding spindle. In this situation it is advantageous if the tool magazine can travel on a magazine slide in a separate slide guide which is disposed between the grinding station and the tool holder.

In one embodiment of the invention, a connection point for the coolant supply device of each tool to be used is disposed beside the tool receiver of the grinding spindle, which connection point has an insertion opening, which extends parallel to the workpiece receiver, for a connection nipple of the coolant supply device of each tool to be used. This design has the advantage that during the advance movement of the grinding spindle towards the tool to be received the connection nipple of the coolant supply device also slides into the insertion opening, so that, simultaneously with the chucking of the tool, the coolant supply device can also be also tightly sealed and securely held, whereby the correct position of the coolant nozzle is ensured in relation to the tool.

The coolant supply devices and the tools are disposed in all the holders in the same manner such that the tool axis and the connection nipple axis are parallel to each other and are at a spacing from each other which is the same as that between the tool receiver and the insertion opening in the grinding spindle. It is thereby possible, by virtue of the drive mechanisms which are present in the grinding machine anyway, rapidly and reliably to change very different tools, together with their respective coolant supply devices, which themselves can be differently fashioned and can be matched to the tool concerned.

One particularly advantageous embodiment is achieved if all the holders have receiver openings for the tool and for the coolant supply device, which receiver openings are open on the same side. It is then possible to withdraw the tool which is chucked in the grinding spindle and the coolant supply device, which is chucked beside the grinding spindle, from the holder in the magazine by a movement of the grinding spindle transverse to its axis of rotation, and to bring them into their operating position whilst the holders remain in the magazine, which can then be moved back to its initial length.

In order firstly to hold the tools securely in the magazine and secondly to be able effortlessly to withdraw them from the magazine together with their matched coolant supply devices, the tools and coolant supply devices are advantageously held in the receiver openings of the holders by spring clips, so that after they have been introduced into the tool receiver and into the coolant connection point, respectively, they can easily be slid out of their holders by a movement of the grinding spindle transverse to the spindle axis.

Other features and advantages of the invention follow from the description given below and from the drawings, which illustrate examples of preferred embodiments of the invention in greater detail, and where:

DETAILED DESCRIPTION OF THE INVENTION

Figure 1:
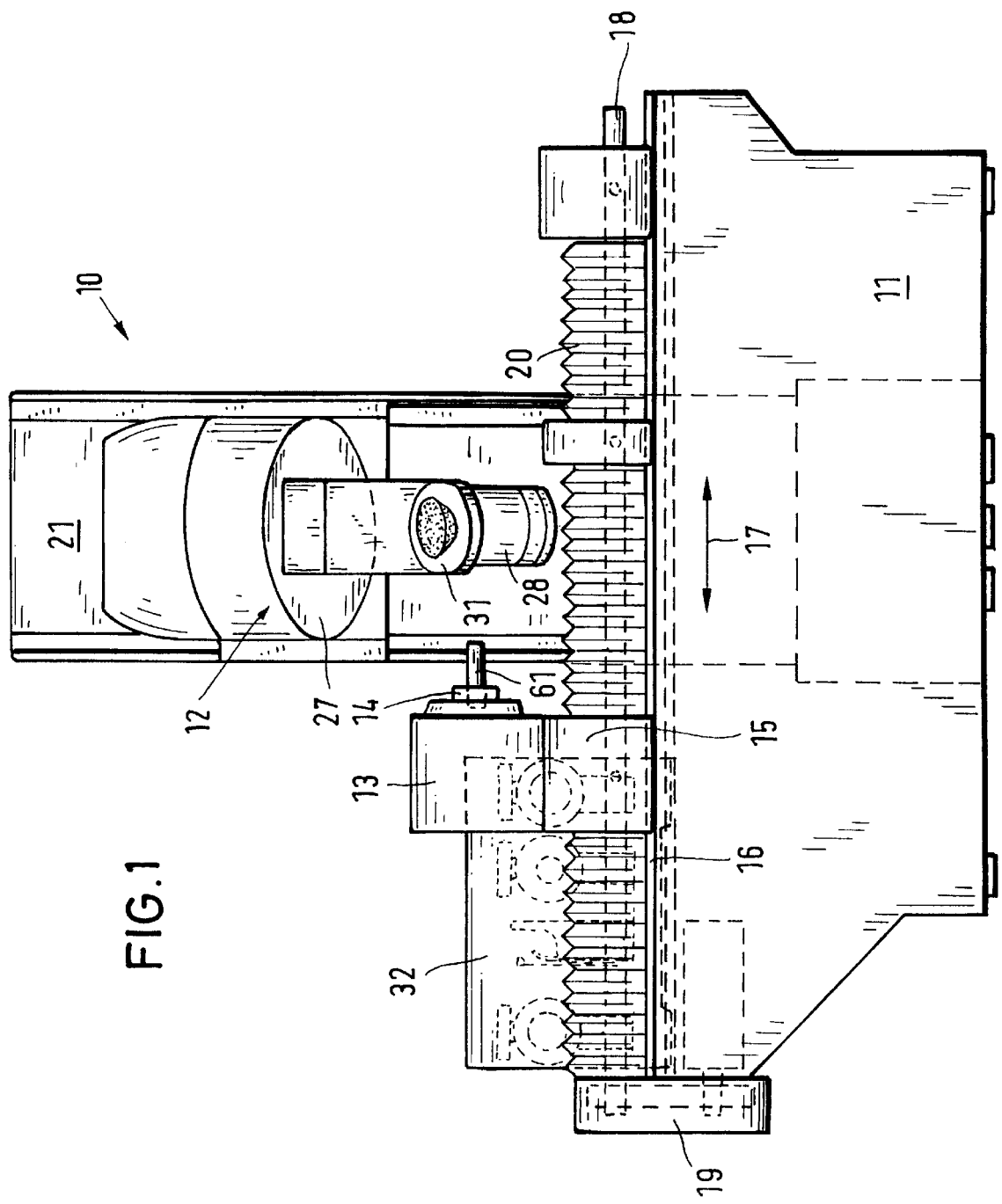
FIG. 1 is a front view of a universal grinding machine according to the invention.

In the drawings, reference numeral 10 denotes a universal grinding machine which can be used for various grinding operations, particularly for the grinding of tools. The grinding machine 10 has a machine bed 11 on which a grinding station 12 and a workpiece holder 13 are disposed. In the embodiment illustrated, the workpiece holder comprises a workpiece spindle 14, which is driven in rotation, and which can be moved to and fro in a transverse direction 17 in front of the grinding station 12 by a workpiece spindle slide 15 on a workpiece slide guide 16. For this transverse movement, the workpiece holder 13 is moved by a spindle 18, which is rotated by a spindle drive mechanism 19 and which is protected from contamination by a bellows device 20.

Figure 2:
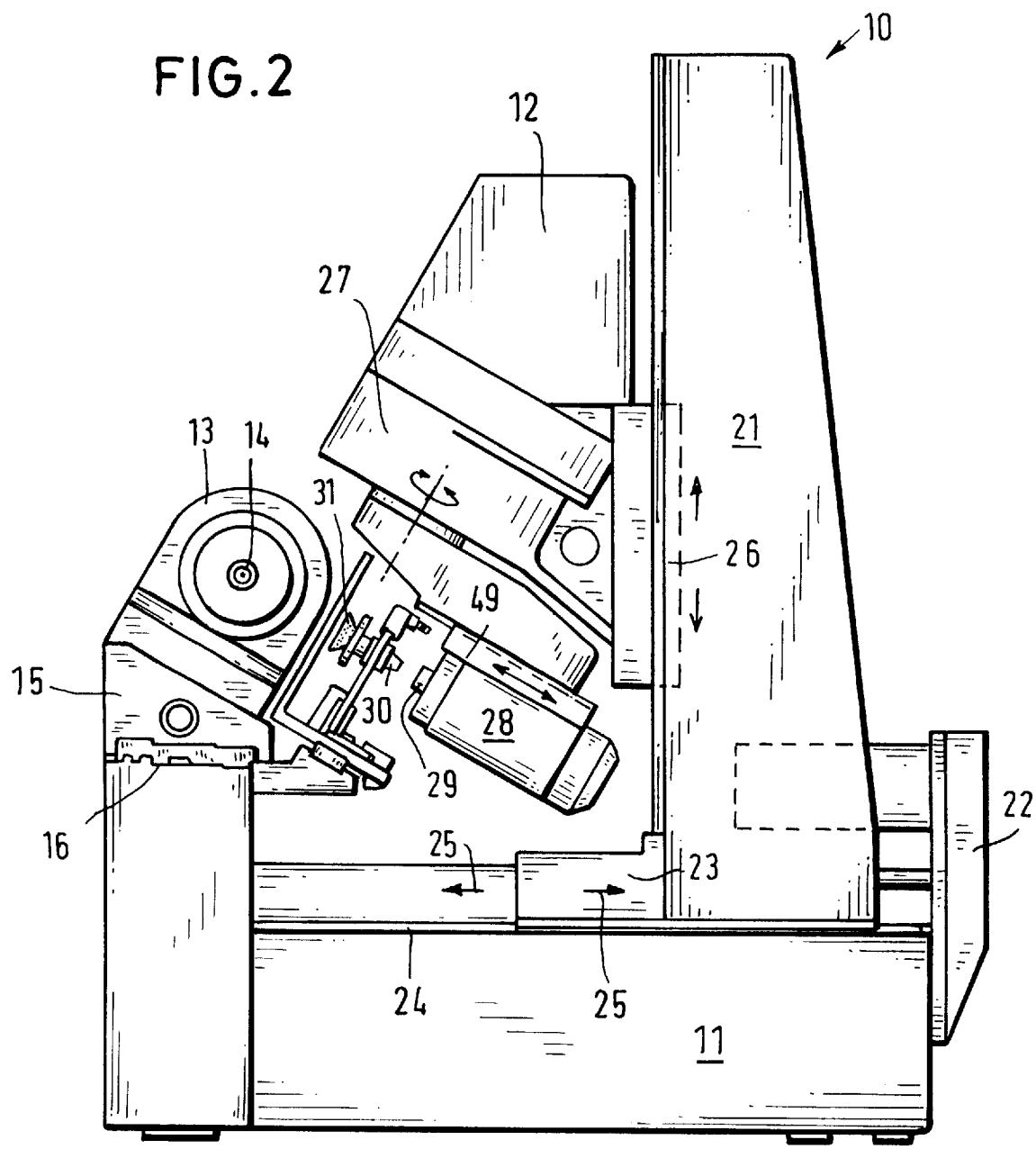
FIG. 2 is a side view of the machine shown in FIG. 1.

The grinding station 12 consists of a pillar 21, which can be moved backwards and forwards in the direction of arrows 25 in relation to the workpiece holder 13 by a linear drive mechanism 22 with a pillar slide 23 on a pillar slide guide 24. The pillar 21 has a vertical slide guide 26 on which a gear-box 27, which carries a grinding spindle 28 which is swivel-mounted thereon, can be moved vertically. The grinding spindle 28 can be adjusted in the direction of the spindle axis by a combined movement of the pillar slide 23 and the 27, as indicated by the double arrow in FIG. 2. The grinding spindle 28 has a tool receiver 29, which comprises a clamping chuck, or another clamping device which is preferably operated hydraulically, with which the holding mandrel 30 of a grinding tool 31 can be chucked.

Figure 3:
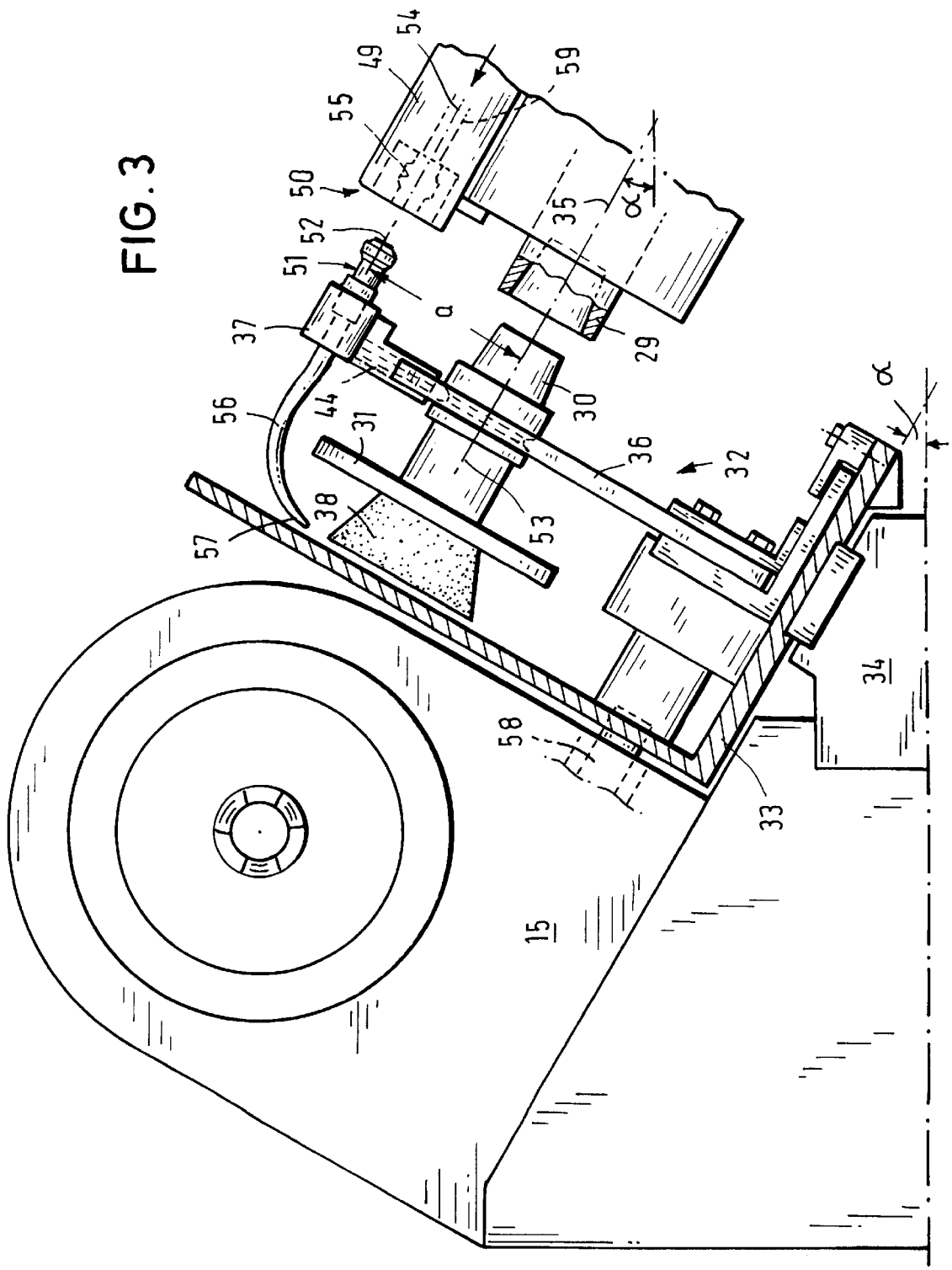
FIG. 3 shows a detail of FIG. 1 on an enlarged scale, and is a cross-section through the tool magazine which has been moved in front of the grinding spindle and which is in its stand-by position.

So as to be able to perform different grinding operations with the universal grinding machine according to the invention, tools of different shapes are necessary which can be interchanged and which are accommodated in a tool magazine 32 (FIG. 3).

The tool magazine 32 consists of a tool slide 33, which, just like the workpiece holder 13, can be moved in a transverse direction 17 on a tool slide guide 34 in front of the grinding station 12 and the grinding spindle 28. The tool slide guide 34 is situated between the grinding spindle 28 and the workpiece slide guide 15 and is parallel to the latter.

It can be seen from FIGS. 3 to 7 that the tool slide guide 34 is inclined to the horizontal at the same angle α which the grinding spindle axis 35 also forms with the horizontal.

Figure 7:
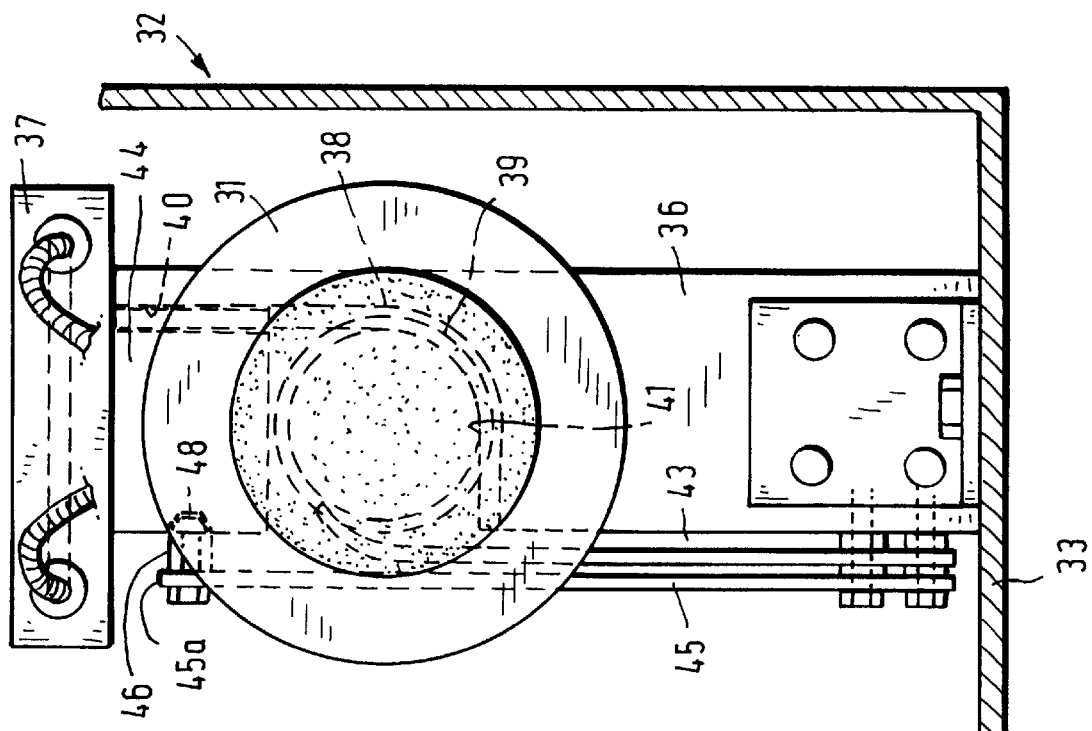
FIG. 7 is a partial aspect of the tool magazine, which comprises two tool holders, of which the one on the right is equipped with a tool and an associated coolant supply device, whilst the tool and the coolant supply device have been removed from the tool holder on the left.
Figure 8:
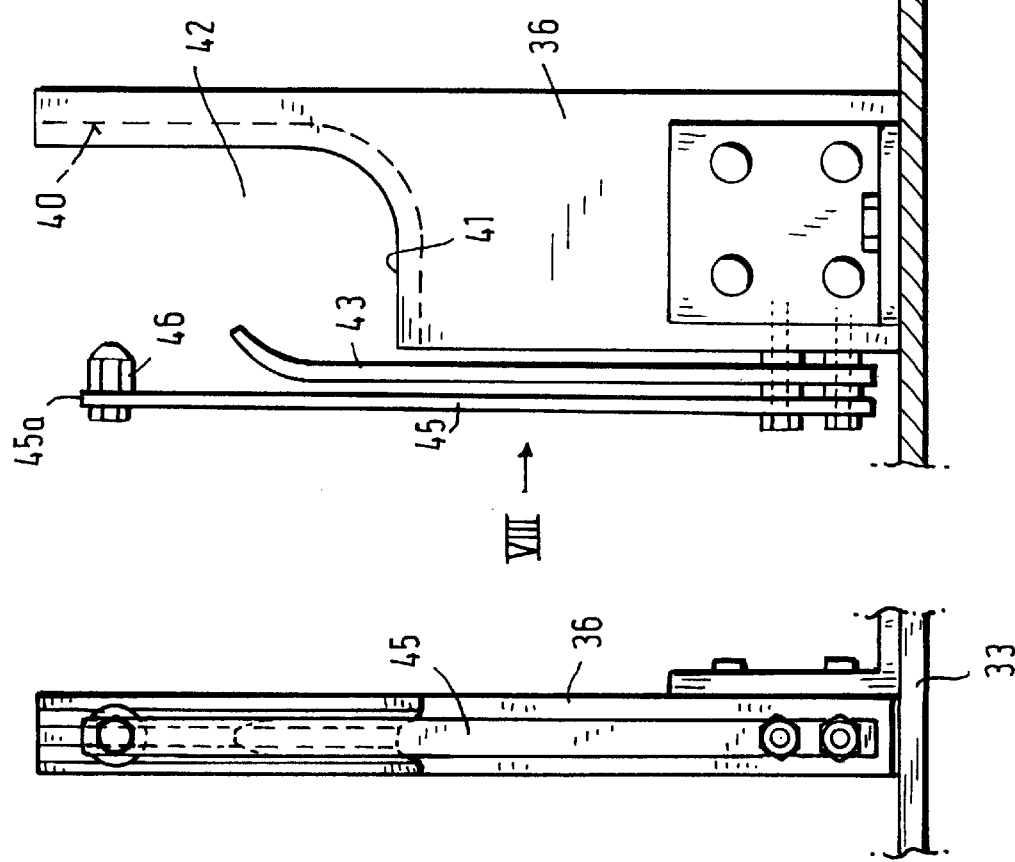
FIG. 8 is a front view of the subject of FIG. 7 in the direction of arrow VIII.

There is a plurality of holders 36 which are disposed side by side in the longitudinal direction on the base of the tool slide 33. These holders are of identical construction, and can each receive a grinding tool 31 and a coolant supply device 37 which is matched thereto. The different grinding tools 31 haven differently constructed grinding heads 38, but are all equipped with identical holding mandrels 30, so that they all fit into the tool receiver 29 of the grinding spindle 28. They have a V-shaped surrounding groove 40, into which a correspondingly shaped bead 39 fits which is situated on the inner edge of a receiver opening 42 which is open at its upper face 41 and in which the respective tool is held by a spring clip 43, for example by a bent leaf spring. A holding plate 44 of a coolant supply device 37, which is matched to the grinding tool 31, is inserted in the receiver opening above the grinding tool 31. Said holding plate is likewise held in the receiver opening 42 by a spring clip 45. At its free end 45a the spring clip 45 has a stud comprising a tapered tip 46, which fits into a correspondingly formed indentation 48 in the holding plate 44 but which can easily be unlatched therefrom when the holding plate of the coolant supply device 37 is withdrawn upwards from the receiver opening 42 (FIG. 7).

Turning now to FIGS. 3 to 6, it can be seen that a connection point 50 for the coolant supply device 37 of each grinding tool to be used is provided in a grinding spindle mounting 49 beside the tool receiver 29 of the grinding spindle 28. The coolant supply device 37 has a connection nipple 51 for this connection, which is connected in a liquid-tight manner to the connection point 50 when it is inserted therein. The construction here is such that the connection nipple axis 52 and the tool axis 53 are already parallel to each other in the holder 36 and are also of course parallel to each other after introducing the tool and the coolant supply device into the grinding spindle, and are at a spacing a from each other which is the same as that between the grinding spindle axis 35 and the axis 54 of the insertion opening 55 for the connection nipple 51.

It can be seen from FIGS. 3 to 6 that coolant is supplied through a coolant line in the grinding spindle mounting 49 and enters the coolant supply device 37 through the connection nipple 51. The coolant supply device comprises one or more bent coolant tubes 56 with spray nozzles 57 which are directed on to the locations of the grinding head 38 which are to be cooled. The coolant tube 56 and the spray nozzle(s) 57 are already in the correct position for machining when they are seated in their holder 36. They retain this position even when the holding mandrel 30 and the connection nipple 51 have been introduced into the tool receiver 29 and into the connection point 50, respectively, and when they have been locked there and their holder 36 has been removed.

Figure 4:
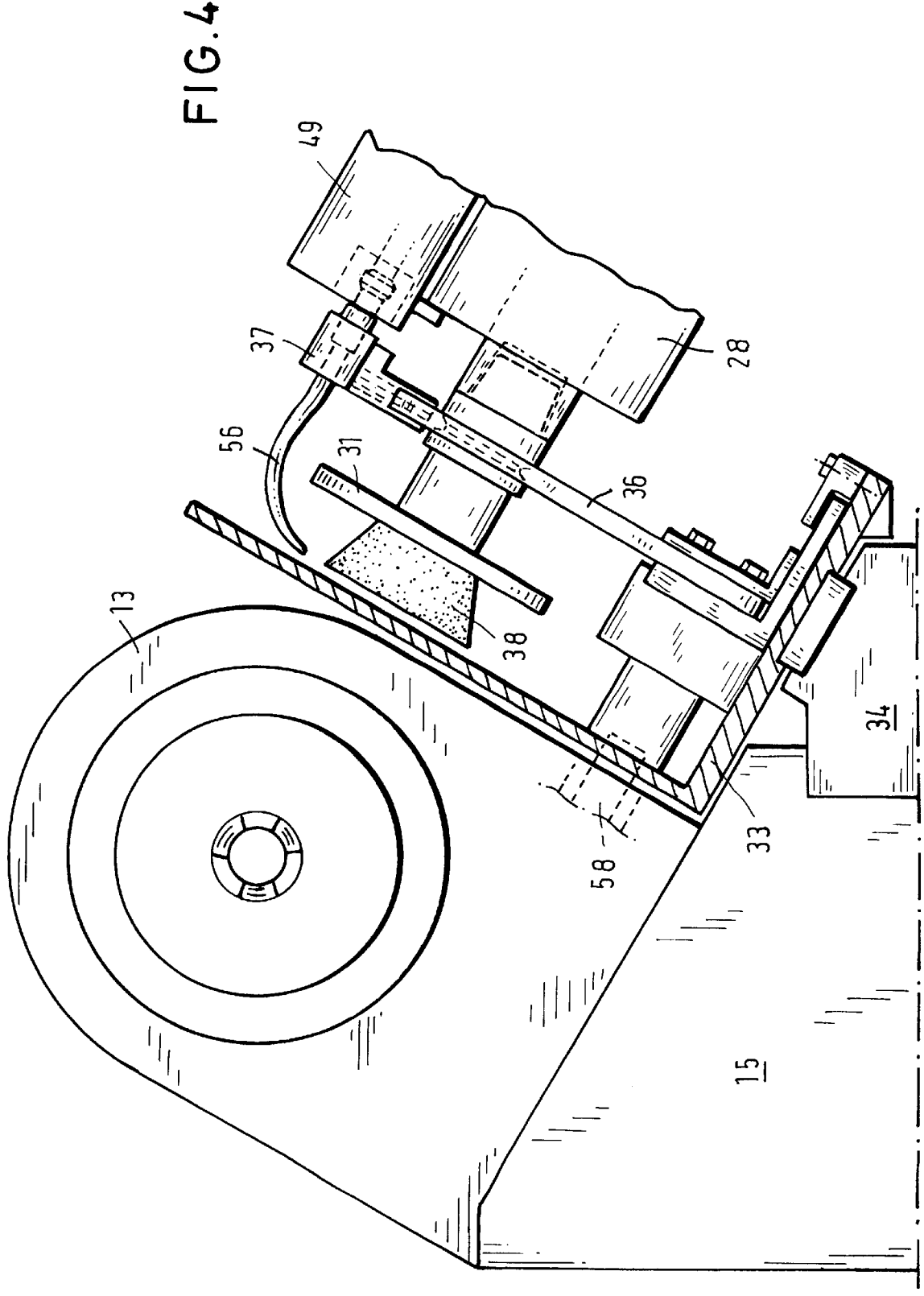
FIG. 4 is an illustration corresponding to that of FIG. 3, in which the tool receiver of the grinding spindle has moved over the tool to be used.

It can be seen from FIG. 4 that the tool slide of the tool magazine 32 can be coupled to the workpiece spindle slide 15 by an axially displaceable peg 58. It is thereby possible also to utilise the drive mechanism of the workpiece spindle slide 15 for the drive mechanism of the tool slide 33, and to move the tool slide 33 along the slide guide 34 and bring the desired grinding tool 31 in front of the tool receiver 29 of the grinding spindle 28 by an axial movement of the workpiece spindle slide 15. As soon as the holding mandrel 30 of the tool receiver 29 is opposite the grinding spindle 28 and the connection nipple 51 of the coolant supply device 37 is simultaneously opposite the connection point 50, the grinding spindle 28, which is situated in its base position, is moved axially towards the grinding tool 31 by its slides 23 and 26 until the tool receiver 29 fits over the holding mandrel 30 and the connection point 50 fits over the connection nipple 51. The grinding tool 31 and the coolant supply device 37 are then clamped and sealed, respectively, by closing the chuck and by closing the seal for the connection nipple. This situation is illustrated in FIGS. 4 and 5.

Figure 5:
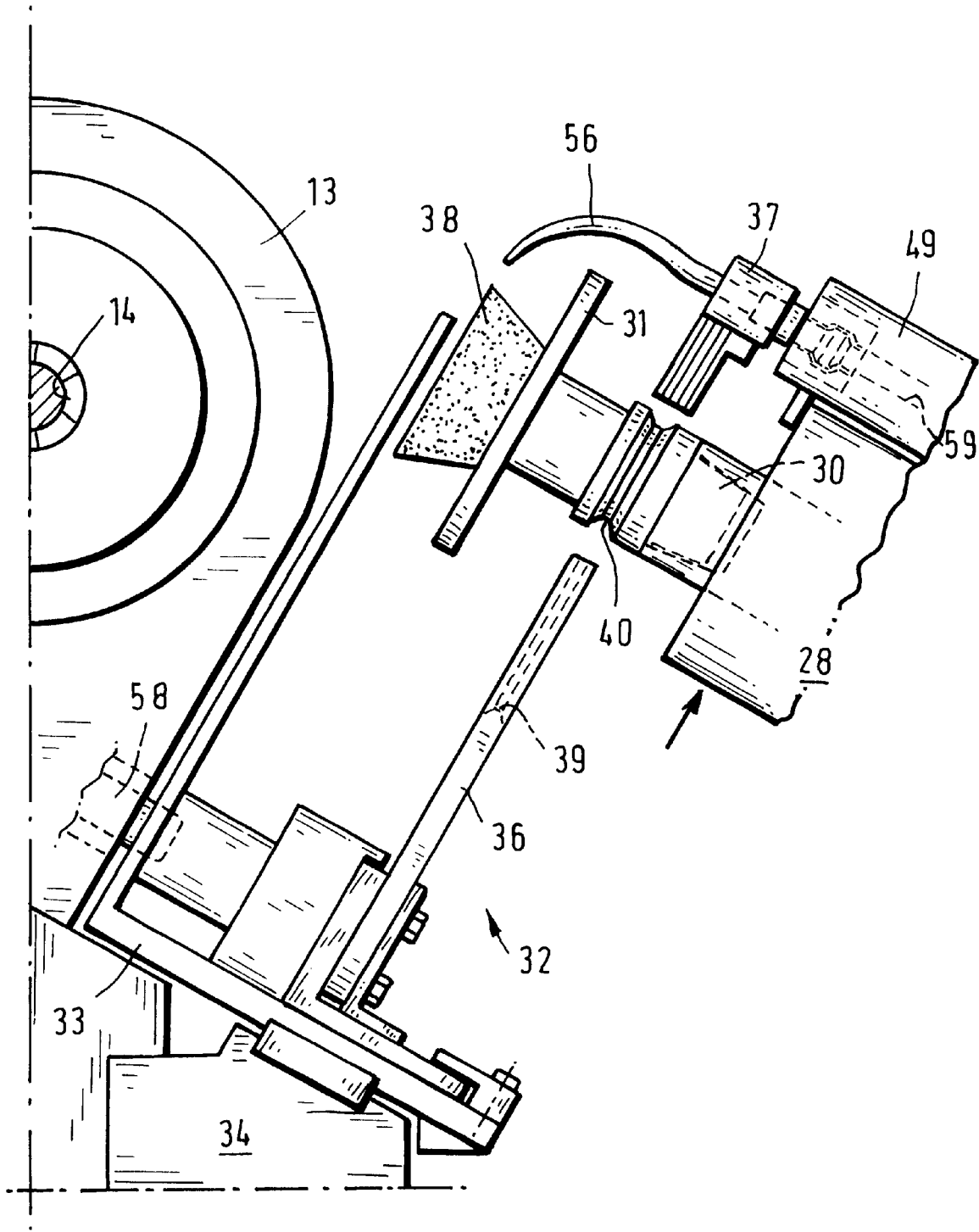
FIG. 5 is a partial illustration corresponding to that of FIG. 4, in which the grinding spindle, with the tool inserted and with the coolant supply device inserted, has moved out upwards from the holder.

Thereafter, the grinding spindle travels upwards, perpendicularly to the grinding spindle axis 35, due to a vertical movement of the tool holder 27 and a horizontal movement of the pillar 21, whereby the holding plate 44 of the coolant supply device 37 and the grinding tool 31 are withdrawn upwards from their holder 36, whilst their spring clips 43 and 45 move back laterally (FIG. 5).

Figure 6:
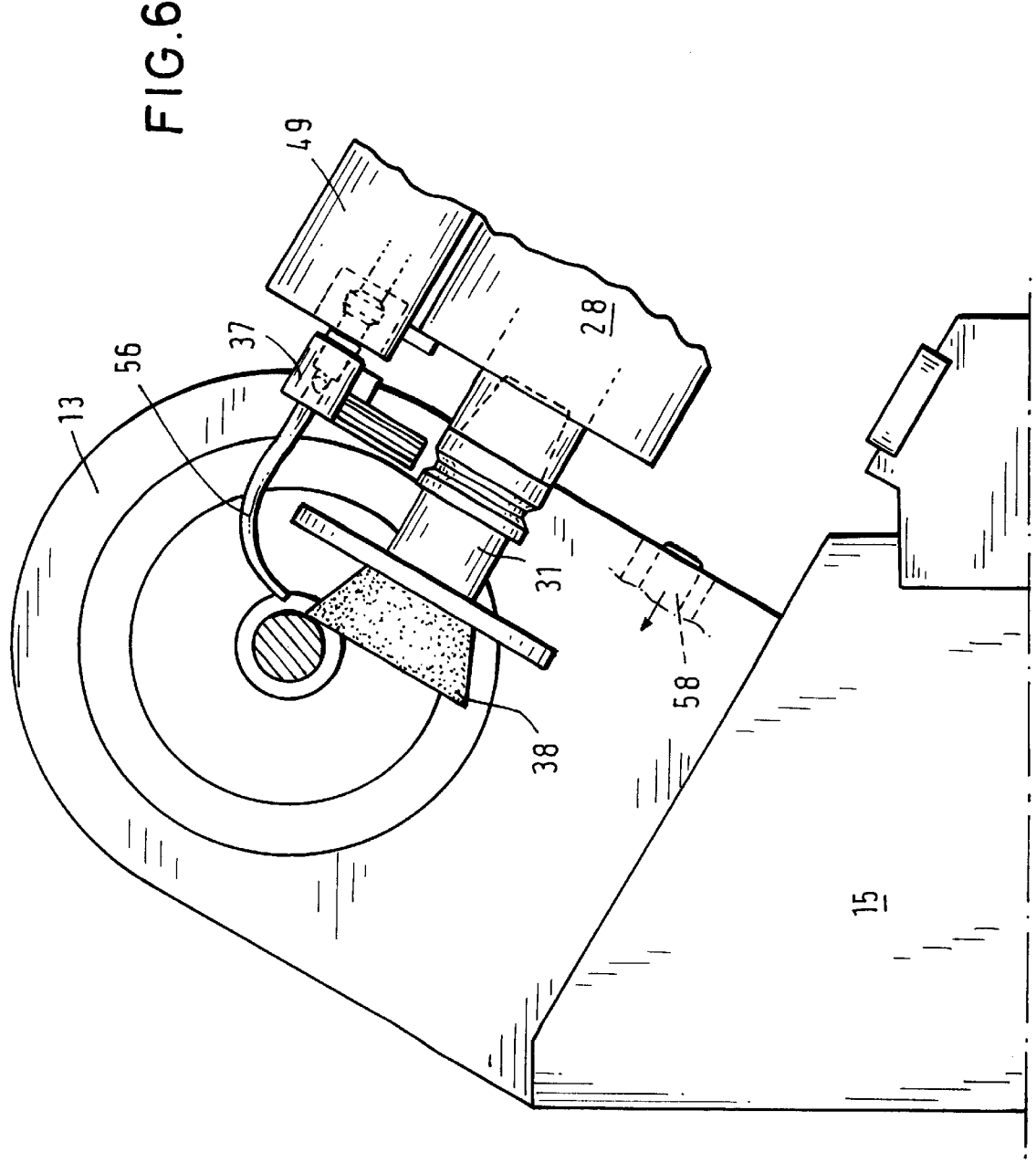
FIG. 6 is an illustration corresponding to those of FIGS. 3 and 4, in which the tool magazine has been removed and the tool which is chucked in the grinding spindle, and its coolant supply device, are situated in the operating position.

The tool magazine 32 can then be moved out laterally in a transverse direction by means of the workpiece holder 13, which is then uncoupled from the tool magazine again and can advance into its operating position in relation to the grinding tool. The grinding spindle 28 with the chucked grinding tool 31 and the coolant supply device 37 which is matched thereto can then be advanced to the workpiece and the grinding operation can commence (FIG. 6).

The invention is not restricted to the forms of construction which have been described and illustrated. On the contrary, numerous modifications and additions are possible without departing from the scope of the invention. For example, the holders in the tool magazine could also be disposed somewhat differently and could be constructed so that the grinding tools and their coolant supply devices are not withdrawn upwards but are withdrawn laterally. Moreover, it is possible to provide the coolant supply devices with a plurality of coolant tubes and nozzles, and it is also possible to provide a plurality of coolant connections beside the grinding spindle. Furthermore, the tool magazine could be equipped with separate drive mechanisms.

What is claimed is:

1. A universal grinding machine comprising:

a grinding station, a grinding spindle disposed in said grinding station, said grinding spindle being capable of being advanced at least axially and having a tool receiver for receiving a plurality of different grinding tools, a tool magazine containing said plurality of different grinding tools and capable of moving transversely to and from in front of said grinding spindle, said tool magazine comprising a plurality of tool holders, each said tool holder having a grinding tool and a coolant supply device associated with said grinding tool in a position which allows said grinding tool to be introduced axially into said tool receiver, said coolant supply device being capable of supplying coolant to said grinding tool at the correct location during operation.

2. A machine according to claim 1, wherein the tool magazine can be coupled to a workpiece holder and can be moved to and from together with the workpiece holder in front of the grinding spindle.

3. A machine according to claim 1, wherein the tool magazine can be moved on a tool magazine slide in a separate tool slide guide which is disposed between the grinding station and the workpiece holder.

4. A machine according to claim 1, wherein a connection point for the coolant supply device of each tool to be used is disposed beside the tool receiver of the grinding spindle, which connection point has an insertion opening, which extends parallel to the workpiece received, for a connection nipple of the coolant supply device of each tool to be used.

5. A machine according to claim 4, wherein the coolant supply devices and the tools are disposed in all the tool holders in the same manner such that the tool axis and the connection nipple axis are parallel to each other and are at a spacing from each other which is the same as that between the tool receiver and the insertion opening in the grinding spindle.

6. A machine according to claim 4, wherein all the tool holders have receiver openings for the tool and for the coolant supply device, which receiver openings are open on the same side.

7. A machine according to claim 6, wherein the tools and coolant supply devices are held in the receiver openings of the tool holders by spring clips and after they have been introduced into the tool receivers and into the insertion opening beside the grinding spindle they can be withdrawn from their holders by a movement of the grinding spindle transverse to the spindle axis.

* * * * *